Patented Sept. 7, 1937

2,092,004

UNITED STATES PATENT OFFICE 2,092,004

MANUFACTURE OF ARTIFICIAL TEXTILE AND OTHER MATERIAL

Robert Wighton Moncrieff, Frank Brentnall Hill, and Thomas Barnard Frearson, Spondon, near Derby, England, assignors to Celanese Corporation of America, a corporation of Delaware No Drawing. Application November 9, 1934, Serial No. 752,376. In Great Britain November 22, 1933

14 Claims. (Cl. 8—20)

This invention relates to the manufacture of artificial textile and other materials and in particular to the saponification of materials comprising organic esters of cellulose. The invention is of special importance in connection with the manufacture of filaments, threads, fibres, yarns, ribbons and the like from cellulose acetate by processes involving saponification, and will be described with particular reference to such manufacture.

In the saponification of threads of cellulose acetate and like materials of the type referred to above, the agents commonly used are caustic soda or caustic potash. The use of these agents, however, presents certain disadvantages. Thus except by special methods, it is difficult to obtain saponification throughout the material, the tendency being for the saponifying agent to attack the surface of the material intensively, and to leave the core substantially unaffected. While this type of effect is of considerable value for some purposes, in other cases it is to be avoided. Again, unless the temperature, concentration and time of treatment are carefully controlled, the use of caustic soda and caustic potash as saponifying agents involves some danger of damaging the materials, which both in the partially saponified and in the completely saponified condition, are very sensitive to such strong alkalies. A considerable amount of research has therefore been carried out with a view to discovering saponifying agents which shall be free from these and other disadvantages of the strong mineral bases.

We have now discovered that it is of considerable advantage to employ as saponifying agents ethylene diamine or other amines containing more than one amino group, such for example as symmetrical dimethyl-ethylene-diamine, monomethyl-ethylene diamine and propylene diamine. Preferably at least one of the amino groups in the amine should be unsubstituted or mono-substituted. Especially valuable results have been obtained with aliphatic diamines, particularly those of relatively low molecular weight. The use, however, of amines containing more than two amino groups, for example 1:2:3-triaminopropane, is not excluded. The effect of one or more hydroxy groups in the amine appears to be to favour the penetration of the materials by the saponifying agent. Thus, for example, substances of the type of $\alpha$ $\gamma$-diamino-$\beta$-hydroxy propane may be employed with this object in view.

The invention is particularly applicable to the treatment of filaments, threads, yarns, fibres, ribbons and the like of cellulose acetate or fabrics containing such materials, and is also applicable to the treatment of materials made of or containing other organic esters of cellulose, for example cellulose formate, propionate or butyrate, and to ether-esters of cellulose, for example ethyl cellulose acetate and oxyethyl cellulose acetate. The filaments and the like to which the saponification process of the present invention is applied may be made by wet or dry spinning processes. Among such processes mention may be made of those described in U. S. applications S. Nos. 402,785 filed 26th October, 1929, 418,414 filed 3rd January, 1930, 437,423 filed 20th March, 1930, 469,622 filed 21st July, 1930 and 601,043 filed 24th March, 1932. The cellulose acetate or other organic esters of cellulose employed may be of high viscosity, for example of viscosity above 30 up to 100 or even 200 or more. The process of the invention may be applied with advantage however to materials of considerably lower viscosity, for example 25 down to 10 or even less. The filaments and the like, whether produced by dry or wet spinning processes, may be stretched to a considerable extent in the presence of a softening agent, according for example to the processes of U. S. Patent No. 1,709,470 and U. S. applications S. Nos. 378,684 filed 16th July, 1929 and 573,424 filed 6th November, 1931. Such stretching processes may result in an increase in length of 100, 200 or even 500% or more of the original length of the material, and by such means materials of relatively high tensile strength, e. g. 2.5, 3 or even 4 grams per denier, may be obtained.

The saponifying agents may be applied to the materials in any suitable manner. Preferably they are applied in the form of an aqueous bath. A convenient method, especially when conditions are such that saponification is relatively slow, is to suspend the material in hank form from rods which are caused to travel from one end of the bath to the other and at the same time to revolve so as to immerse each portion of the hank in turn to the same depth. A method which is to be preferred when saponification is relatively rapid is to pass the materials continuously through the bath. When the materials are in thread or like form they are preferably treated in "warp formation", i. e. a large number of ends are drawn through the bath in substantially parallel relationship one to another. Thus, yarn may be drawn from a creel by means of suitable godets, rolls, or like members partially or completely immersed in the bath and extending across the whole assembly of ends or so-called "warp", through a reed into and through the bath and through a further reed or reeds to suitable collecting means situated outside the bath. Again, the materials may, for example in the form of hanks or other suitable packages, be introduced into a bath containing the saponifying agent and allowed to remain in contact therewith until the desired degree of saponification is effected.

During saponification and/or any after treatment applied, e. g. washing, the materials may be under considerable applied tension. Saponification may however be effected under little or no applied tension so as to facilitate contraction. Thus, e. g. in the case of travelling materials, the rate of travel may be made to decrease along the path as described in U. S. application S. No. 668,070 filed 26th April, 1933.

The saponifying medium may contain solvents, swelling agents or latent solvents for the base of the materials. Thus for example when the materials treated comprise cellulose acetate or other ester of similar solubility properties the saponifying medium may contain, for instance, methyl, ethyl, propyl or butyl alcohols, ethylene, glycol or its mono-methyl or ethyl ethers, glycerol, benzyl alcohol, cyclo-hexanol and diacetone alcohol, cyclohexanone, acetone, methyl-ethyl-ketone, dioxane, methylene ethylene ether, ethylidene ethylene ether and the dimethyl ether of ethylene glycol. It is of particular value to employ substances capable of swelling the material when the base employed is relatively slowly acting. When solvents are present they must not be in such concentration as to damage the material.

The conditions, for example temperature and concentration of the saponifying agent, should preferably be such that saponification is effected relatively rapidly, e. g. in the space of 2 or 3 to 4 or 5 minutes. In the case of ethylene diamine, for example, it has been found possible to render cellulose acetate substantially insoluble in acetone by a bath treatment with a 20 to 25 or 30% aqueous solution for approximately four minutes. An indication of the extent to which saponification has occurred throughout the material is given by the fact that in these circumstances the loss of weight involved is only of the order of 5-10%. The concentration of the amine need not be as high as this to obtain useful results. It may for example be 15 or even 10% or lower, depending on the temperature. Higher concentrations are to be preferred however. Due regard must be had to the possibility of damaging the materials by employing too high a concentration or temperature or too protracted a period of contact. The lower the temperature the higher the concentration which can be employed with safety. Relatively high temperatures are however to be preferred, for example 70–90° C. or even higher, but lower temperatures may be adopted, e. g. 40–60° C. or even less. At temperatures approaching the boiling point it is of particular advantage to adopt means such as are described in U. S. application S. No. 690,122 filed 19th September, 1933 for limiting evaporative losses.

The invention is not limited as to the degree of saponification effected which will naturally depend upon the particular purpose in view. This may be merely to raise the safe ironing point of the materials, or it may be with the object of imparting an affinity for cotton dyes. This may be done without substantial loss of affinity for cellulose ester dyes, for example the dispersed insoluble dyes. Or saponification may be sufficiently intensive to destroy the affinity for such cellulose ester dyes. The tensile properties of the materials treated, e. g. tenacity and extensibility may also be improved as a result of the treatment. It is an advantage of the invention that it enables a very deep seated saponification, which may even extend substantially throughout the whole of the material to be effected. Thus a relatively small loss of weight, e. g. 10% or less may render it insoluble in acetone and impart a high affinity for cotton dyes. Saponification may, however, involve a much greater loss in weight, e. g. 20–30 or even more, and may even be complete throughout. In this way regenerated cellulosic materials may be obtained having properties unattainable by the ordinary processes for the production of such materials.

The following examples illustrate the invention.

Example 1

A hank of cellulose acetate yarn is immersed in a 20–30% solution of ethylene diamine at 80–90° C. for a period, for example 3–5 minutes, depending on the amount of saponification required.

After this period the material is removed from the bath, washed and dried.

Example 2

Cellulose acetate yarn is led continuously in warp formation from a creel through a saponifying bath of the composition of that in the preceding example, then through a washing bath, and over a series of drying rollers, to suitable collecting means.

The saponifying bath is maintained just below the boil and the speed at which the materials pass through the bath is adjusted according to the degree of saponification required so as to give a time of contact between 3 and 5 minutes.

Example 3

The process is carried out as in Example 1 or 2, except that a 15–20% solution of ethylene diamine is employed, the saponifying bath being maintained at 70–80° C.

During the saponification some shrinkage of the yarn may occur, particularly when a low twist yarn is treated in hank form. More highly twisted yarns are less apt to shrink.

As a modification of the invention colouration of the materials may be effected continuously with saponification, and dyes, e. g. cotton dyes or cellulose ester dyes, for example of the dispersed insoluble type, may be applied in the saponifying medium. The materials obtainable by the process of the invention lend themselves particularly to the production of differential colour effects, besides other effects which may be obtained by virtue, for example, of the different behaviour of the saponified and unsaponified materials to swelling agents, hot aqueous media, and other treating agents.

What we claim and desire to secure by Letters Patent is:—

1. Process for the treatment of organic esters of cellulose, which comprises saponifying said esters by treatment with a base containing at least two amino groups and from 2 to 4 carbon atoms in aqueous solution.

2. Process for the treatment of organic esters of cellulose, which comprises saponifying said esters, in the form of filaments, threads, ribbons or like materials, by treatment with a base containing at least two amino groups and from 2 to 4 carbon atoms in aqueous solution.

3. Process for the treatment of cellulose acetate, which comprises saponifying said cellulose acetate by treatment with a base containing at least two amino groups and from 2 to 4 carbon atoms in aqueous solution.

4. Process for the treatment of cellulose acetate, which comprises saponifying said cellulose acetate, in the form of filaments, threads, ribbons or like materials, by treatment with a base containing at least two amino groups and from 2 to 4 carbon atoms in aqueous solution.

5. Process for the treatment of organic esters of cellulose, which comprises saponifying said esters by treatment with a water-soluble aliphatic diamine containing from 2 to 4 carbon atoms in aqueous solution.

6. Process for the treatment of organic esters of cellulose, which comprises saponifying said esters by treatment with a base containing two amino groups separated by 2 to 3 carbon atoms in aqueous solution.

7. Process for the treatment of organic esters of cellulose, which comprises saponifying said esters by treatment with ethylene diamine in aqueous solution.

8. Process for the treatment of organic esters of cellulose, which comprises saponifying said esters, in the form of filaments, threads, ribbons or like materials, by treatment with ethylene diamine in aqueous solution.

9. Process for the treatment of cellulose acetate, which comprises saponifying said cellulose acetate, in the form of filaments, threads, ribbons or like materials, by treatment with ethylene diamine in aqueous solution.

10. Process for the treatment of cellulose acetate, which comprises subjecting filaments, threads, ribbons or like materials having a basis of cellulose acetate to saponification by drawing them in warp formation through an aqueous bath containing 15 to 30% of ethylene diamine at a temperature of 60 to 90° C.

11. Process for the treatment of cellulose acetate, which comprises subjecting filaments, threads, ribbons or like materials having a basis of cellulose acetate, to saponification by means of an aqueous solution of a base containing at least two amino groups and 2 to 4 carbon atoms until a loss in weight of 8 to 12% is effected.

12. Process for the treatment of cellulose acetate, which comprises subjecting filaments, threads, ribbons or like materials having a basis of cellulose acetate, to saponification by means of an aqueous solution of a base containing at least two amino groups and 2 to 4 carbon atoms until complete saponification is effected.

13. Process for the treatment of organic esters of cellulose, which comprises saponifying said esters, in the form of filaments, threads, ribbons or like materials having a tenacity of at least 2.5 grams per denier, by treatment with a base containing at least two amino groups and from 2 to 4 carbon atoms in aqueous solution.

14. Process for the treatment of cellulose acetate, which comprises saponifying said cellulose acetate, in the form of filaments, threads, ribbons or like materials having a tenacity of at least 2.5 grams per denier, by treatment with a base containing at least two amino groups and from 2 to 4 carbon atoms in aqueous solution.

ROBERT WIGHTON MONCRIEFF.
FRANK BRENTNALL HILL.
THOMAS BARNARD FREARSON.